United States Patent [19]

Beierholm

[11] 3,909,747

[45] Sept. 30, 1975

[54] BLOCKING OSCILLATOR WITH ENERGY RECOVERY

[75] Inventor: Hans Mogens Beierholm, Augustenborg, Denmark

[73] Assignee: Danfoss A/S, Nordborg, Denmark

[22] Filed: Aug. 26, 1974

[21] Appl. No.: 500,374

Related U.S. Application Data

[63] Continuation of Ser. No. 403,340, Oct. 3, 1973, abandoned.

[30] Foreign Application Priority Data

Oct. 24, 1972 Denmark .......................... 5254/72

[52] U.S. Cl. ............ 331/112; 321/45 ER; 331/185

[51] Int. Cl.² ........................................ H03K 4/16

[58] Field of Search .................... 331/112, 146–149, 331/185; 321/2, 45 ER; 328/67

[56] References Cited

UNITED STATES PATENTS

| | | | |
|---|---|---|---|
| 2,920,259 | 1/1960 | Light | 321/45 ER |
| 3,119,968 | 1/1964 | Schonberg | 328/67 |
| 3,139,585 | 6/1964 | Ross et al. | 328/67 |
| 3,363,184 | 1/1968 | Smith | 328/67 |
| 3,421,069 | 1/1969 | Minks | 321/2 |
| 3,628,047 | 12/1971 | Cronin | 321/45 ER |

*Primary Examiner*—John Kominski

[57] ABSTRACT

A blocking oscillator including a transistor amplifier with a feedback transformer having a main winding in the collector circuit and a feedback winding in the base circuit. The feedback winding also serves as an energy-recovery winding by having a diode connected in series with it. The diode is poled such that, when the amplifier is not conducting, the magnetic energy stored in the transformer is fed back to the power supply.

3 Claims, 3 Drawing Figures

BLOCKING OSCILLATOR WITH ENERGY RECOVERY

Figure 1:
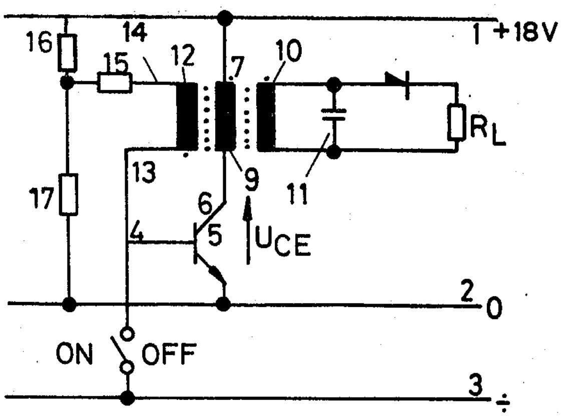

This is a continuation application of Ser. No. 403,340 filed Oct. 3, 1973, now abandoned.

The type of blocking oscillator specified in the present invention includes an amplifier unit and a feedback transformer with a main and a feedback winding plus a D.C. supply to the said blocking oscillator. The invention aims at obtaining an energy recovery in connection with such blocking oscillators.

The problems in connection with most of the blocking oscillators known already are their stability, their low efficiency and their efficiency dependence on the supply voltage. Another drawback in connection with such oscillators is that the collector-emitter voltage can rise to very high values because of the magnetic energy stored up in the transformer. The type related to in the invention is of the sort in which energy is transmitted because the transistor is conductive. It is already known that in such devices overvoltage can be reduced by means of diodes, the latter also serving to neutralize the magnetic energy, for instance parallel to the primary of the transformer.

In a different form the output winding of the transformer is shunted directly to a capacitor, the electric energy stored up in the capacitor during the conductive period of the amplifier unit being used to establish a counter magnetization directed opposite the magnetic energy stored up in the transformer. This form is not very good because it gives a certain loss of efficiency.

Characteristic of the type of blocking oscillator related to in the present invention is that the feedback transformer has an energy-recovery winding connected in series to a diode. A further characteristic is that the said series connection between diode and recovery winding is connected in series in such a way — and parallel to the D.C. supply — that when the amplifier unit is not conductive the magnetic energy stored up in the transformer will be fed back to the D.C. supply.

What is obtained in this simple way is that, because of the polarity change, the energy stored up in the transformer will be of a polarity making the diode conductive, and the current will be conducted back to the D.C. supply, resulting in a reduction of the voltage of the amplifier unit and consequently permitting a less critical amplifier unit and giving a lower consumption of energy.

According to the invention it is an advantage that the energy-recovery winding is the feedback winding. This saves an extra transformer winding, such one being superfluous if the circuit is adequately made.

According to the invention an adequate circuit is obtained, for instance, if the amplifier unit is a transistor, the collector of which is connected, through the primary winding of the feedback transformer, to one of the terminals of the D.C. supply and the emitter of which is connected to the other terminal of the D.C. supply, and if one end of the feedback winding is connected to the same terminal as the collector and the other end of the feedback winding to the base of the transistor, and is characterized by a resistor being inserted between the other end of the feedback winding and the base of the transistor, and one end of a diode being connected to this joint connection between feedback winding and resistor, and the other end of the diode being connected to the other terminal of the D.C. supply and being of a polarity opposite the conduction direction of the base-emitter circuit.

The advantage is that the diode is conductive only when the transistor is non-conductive, and at the same time that the resistor in the base circuit determines the base current of the transistor and the energy recovery required.

According to the invention it is a further advantage that a capacitor is connected parallel to the resistor in the base of the transistor.

The advantage is that at the moment of change-over, for instance when the transistor becomes conductive, a strong current impulse will be obtained, fully exciting the transistor, making the change-over quick and the efficiency high.

So, the invention gives a high efficiency, reduction of the collector-emitter voltage, practically independent of temperature in a very wide range — the range being, for instance, between −25° centigrade and +85° centigrade —, and the efficiency is independent of the supply voltage.

The invention is specified below in embodiments illustrated in the drawings, showing in FIG. 1 — a blocking oscillator as known already, FIG. 2 — the blocking oscillator to which the invention relates, FIG. 3 — various current and voltage diagrams.

In FIG. 1 1 is one of the terminals of the voltage supply, 2 is the other terminal, and 3 is a pre-charge source for the base 4 of the transistor 5, so that by means of a breaker or an electronic contact unit K we can control operation or non-operation of the oscillator. The collector 6 of the transistor is connected to one end of the primary winding 9 of the transformer 7, and the other end of the primary winding is connected to the terminal 1 of the D.C. supply. The transformer has an output winding 10 which is shunted by a capacitor 11; this capacitor serves for charging during the conductive period of the transistor 5, and during the other and non-conductive period of the transistor the energy stored up in the capacitor will neutralize the electric energy in the transformer. In other words, energy is used both for charging the capacitor and for the energy left in the transformer. Further, the transformer 7 has a winding 12 which is a feedback winding, giving a certain positive feedback. One end 13 of the winding is connected to the base 4 of the transistor 5, the other end 14 is connected to a resistor 15 which is connected to the outlet of a voltage divider, consisting of the resistors 16, 17, and the outer terminals of which are connected to the D.C. supply 1, 2.

This type of blocking oscillators has the drawbacks mentioned above, and particularly the voltage in the collector-emitter circuit $U_{CE}$ may rise to very high values and require a transistor with a very high breakdown voltage in the collector-emitter circuit. For instance, at a feed voltage of 18 volts and with the circuit indicated here $U_{CE}$ may rise to about 100 volts, so for safety's sake a 140-volt transistor must be used.

The efficiency and consequently the output depend largely on variations of the supply voltage, the temperature and the amplifier of the transistor.

Figure 2:
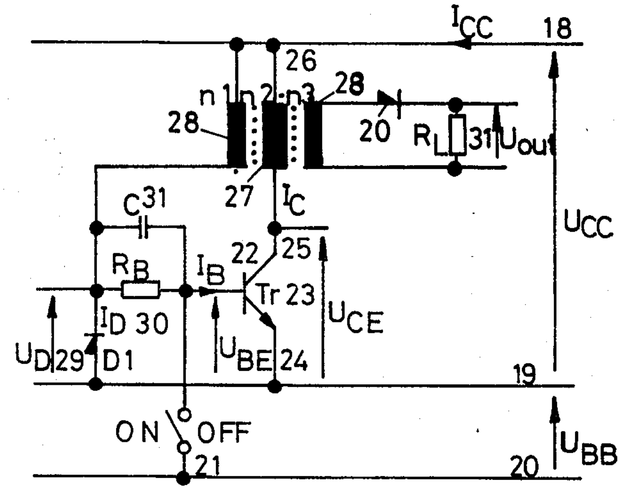

The invention is exemplified in the specification in FIG. 2. It has a D.C. supply $U_{CC}$, one terminal of which is 18 and the other terminal is 19. Through a breaker 21 the excitation $U_{BB}$ 20 can be applied to base 22 and thereby block the transistor 23. The emitter 24 of the transistor 23 is connected to the other terminal 19 of the D.C. supply, and its collector 25 is connected to one end of the primary winding 27 of the transformer 26, and the other end of the winding 27 is connected to the first terminal 18 of the D.C. supply $U_{CC}$. Via a diode 29 the output winding 28 is connected to one end of a load resistor 30. The other end is connected to the other end of the output winding 28. One end of the feedback winding 28 of the transformer 26 is connected to the first terminal 18 of the D.C. supply $U_{CC}$, and via a diode 29 the other end of the same winding 28 is connected to the other terminal 19 of the D.C. supply $U_{CC}$. From the joint connections between the diode 29 and the transformer winding 28 a resistor 30 is connected to the base 22 of the transistor 23. The resistor 30 is shunted by a capacitor 31 which is connected to the above joint connection and to the base 22 of the transistor 23.

Assuming that the transistor 23 is conductive, the collector current $I_C$ will start rising until the transistor can no longer be kept saturated by the base current $I_B$ of the transistor. Then $U_C$ will rise, and because of the positive feedback $I_B$ will drop. Thereby the transistor will be made non-conductive. Now, a certain magnetic energy has been stored up in the transformer 26. This energy is now fed back to the supply voltage through the winding 28 and the diode $D_1$, as a current $I_D$. When this current has dropped to zero, the voltage $U_D$ via the diode 29 will rise again. Now a base current $I_B$ will start passing, and because of the positive feedback the transistor 23 will again become fully conductive. The capacitor 31 serves to provide a strong current impulse when $U_D$ starts rising, bringing about a quicker change-over and consequently a lower change-over loss. When the transistor is non-conductive, special winding and direction will excite in the transformer winding 28 a voltage of a polarity making the diode $D_1$ conductive, and a current will be fed back to the current supply $U_{CC}$.

When the transistor 23 is ON, the capacitor 31 is fully charged, and when the transistor 23 comes OFF, the left-hand side of the capacitor 31 will drop to about −0.5 volt (D1). The right-hand side of the capacitor will become as negative as required for charging the capacitor 31. When $U_{BE} = -6/7$ volt, the base current will be reverse, and the capacitor 31 will then be partly discharged. Further discharge of the capacitor 31 takes place through $R_B$. It is not this discharging procedure which determines when the transistor 23 comes ON again. The transistor 23 will come ON when the energy stored up has been fed back to the supply voltage and the current through D1 has thereby dropped to zero. Then the voltage in the left-hand side of the capacitor 31 will rise, and even if the capacitor 31 might not be fully discharged $U_{BE}$ will also rise until the transistor 23 comes ON.

Figure 3:
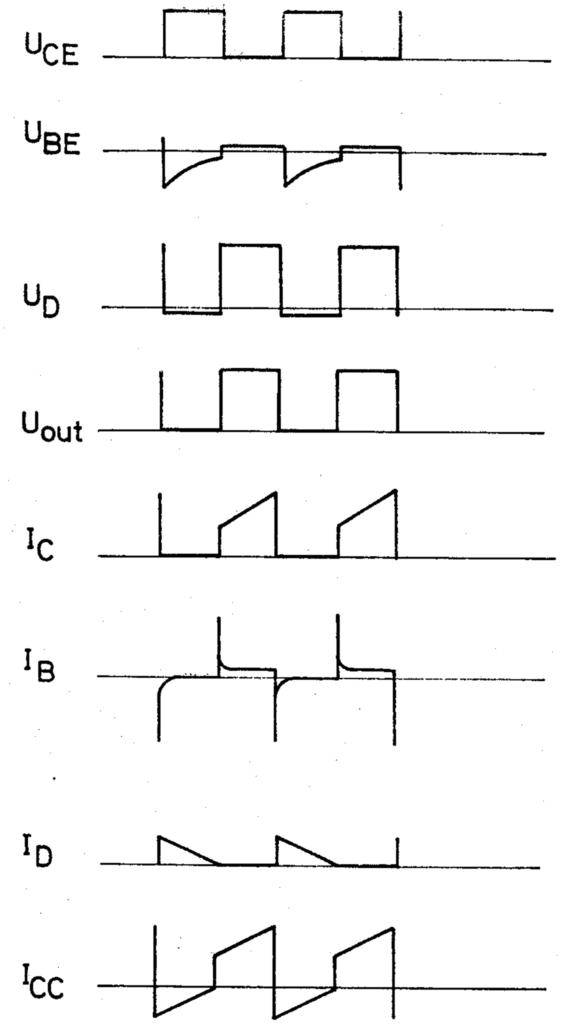

FIG. 3 shows, among other things, the collector-emitter voltage $U_{CE}$, starting when the transistor is non-conductive, then dropping to the saturation level, i.e. nearly zero, then rising again, etc. As the base-emitter voltage $U_{BE}$ is shown in the next time diagram, in which the transistor is non-conductive, the capacitor $C_{31}$ has a negative voltage, the diode $D_1$ being conductive, so that the base 22 will be pre-charged. This charge is discharged partly through the resistor $R_B$ and partly through the base-emitter circuit before the transistor becomes conductive again, and then the base-emitter voltage will rise and remain constant until the transistor is non-conductive again. The diode voltage $U_D$ is shown in the next diagram, in which the first part is negative because of the current passing through the winding 28 and the diode $D_1$, and has a slightly negative voltage in proportion to the potential of the other terminal 19 of the current supply. Then it will remain constant until the transistor becomes conductive again, and will rise to its full value and remain constant.

The output voltage $U_{OUT}$ is shown as having a polarity opposite that of the collector-emitter voltage. The collector current $I_C$ shows the normal, typical cycle, the current dropping to zero and remaining zero apart from the leak current, then rising up to a certain value, and then rising steadily because of the self-induction until the transistor becomes non-conductive again. This will be repeated. The base current $I_B$ is shown in the last diagram but two and is negative. This current peak is due to discharge of the capacitor 31 through the base-emitter circuit, plus a discharge through the resistor 30. When this discharge has been completed, fully or in part, and the transistor starts being conductive again because of the positive voltage via the diode $D_1$, then much current will pass through the capacitor $C_{31}$, which is charged through the transformer winding 28, and then this current will drop to the base current $I_B$, the latter remaining constant for the rest of the conductive period of the transistor. As shown, this will be repeated.

The last diagram but one shows the current $I_D$ through the diode 29, and the first period being the non-conductive period of the transistor the current will rise to a high value, which will drop there because of the self-induction in the transformer 26 until the magnetic energy stored up in the transformer has been spent. Next, when the transistor becomes conductive, the current through the diode 29 will be zero and will, in the next non-conductive period of the transistor, become high again, and will then drop again because of the self-induction in the transformer 26. The current $I_D$ will be fed back to the current supply proper, and the effect of this is seen in the current $I_{CC}$ from the voltage supply $U_{CC}$. From this it is seen that during the non-conductive period of the transistor energy is fed back to the current supply, and then the picture of the current $I_{CC}$ corresponds to the current in the collector $I_C$.

Of course, the embodiment specified is possible with an extra winding, only containing the diode 29 and an extra winding of the same polarity, here shown in FIG. 2, so that what has been mentioned above will be obtained, namely that the energy can be recovered. However, the circuit specified in the embodiment in FIG. 2 is preferable, an extra transformer winding being avoided. In this way we obtain a reduction of the collector-emitter voltage, a high efficiency and practically independence of temperature, and further the efficiency is nearly independent and less dependent on the supply voltage, the conditions only being that the saturation voltage in the collector-emitter circuit must be low and preferably lower than 1 volt until the collector current is equal to the base current multiplied by $H_{FE}$.

What we claim is:

1. A blocking oscillator comprising a direct current supply having first and second terminals, an amplifier constituting a junction transistor having an emitter, collector and base, a feedback transformer connected to said amplifier and having a main winding and an energy-recovery winding, and a diode connected in series with said energy recovery winding in a path in parallel with the first and second terminals of said source, the diode being poled such that when said amplifier is not conducting the magnetic energy stored in said transformer is fed back to the terminals of said source as a current in said path, said energy-recovery winding being a feedback winding connected to said amplifier, a resistor, said collector being connected through said main winding to the first terminal of said supply, said emitter being connected to the second terminal of said supply, and the ends of said feedback winding being respectively connected to the first terminal of said supply and through said resistor to said base, said diode being connected to the junction of said resistor and said feedback winding, and being poled in the reverse sense to the base-emitter junction of said transistor.

2. A blocking oscillator according to claim 1 further comprising a capacitor connected in parallel with said resistor.

3. A blocking oscillator comprising a direct current supply having first and second terminals; a transistor amplifier; a diode; and a feedback transformer having a main winding, an output winding and a feedback winding; said main winding being connected in series with said amplifier between said first and second terminals; said output winding being connected to a load; and said feedback winding forming an energy-recovery winding by being connected directly between said first terminal and said diode, said diode being connected directly between said feedback winding and said second terminal, the junction of said diode and said feedback winding being connected to said amplifier, and said diode being poled such that when said amplifier is not conducting the magnetic energy stored in said transformer is fed back to said first and second terminals.

* * * * *